United States Patent [19]

Kim et al.

[11] Patent Number: 5,607,986
[45] Date of Patent: Mar. 4, 1997

[54] HEAT CURED FOUNDRY MIXES AND THEIR USE

[75] Inventors: Young D. Kim, deceased, late of Dublin, by Bonnie M. Kim, executrix; A. Leonard Haugse, Dublin, both of Ohio

[73] Assignee: Ashland Inc., Columbus, Ohio

[21] Appl. No.: 423,599

[22] Filed: Apr. 17, 1995

Related U.S. Application Data

[63] Continuation-in-part of Ser. No. 180,264, Jan. 12, 1994, abandoned.

[51] Int. Cl.$^6$ ............................................. B22C 1/22
[52] U.S. Cl. ........................... 523/141; 523/144; 524/563; 528/249; 526/270
[58] Field of Search .................................. 523/141, 144; 524/563; 528/249; 526/270; 164/47

[56] References Cited

U.S. PATENT DOCUMENTS

| | | | |
|---|---|---|---|
| 3,216,075 | 11/1965 | Brown | 164/21 |
| 4,317,763 | 3/1982 | Menting | 523/144 |
| 4,350,800 | 9/1982 | Hesse et al. | 525/480 |
| 4,366,267 | 12/1982 | Everett | 523/144 |
| 4,381,813 | 5/1983 | Kottke | 164/527 |
| 4,383,098 | 5/1983 | Menting | 526/270 |
| 4,451,577 | 5/1984 | Coss | 502/167 |
| 4,543,373 | 9/1985 | Krawiec et al. | 523/144 |
| 4,543,374 | 9/1985 | Menting | 523/144 |

*Primary Examiner*—Paul R. Michl
*Assistant Examiner*—John J. Guarriello
*Attorney, Agent, or Firm*—David L. Hedden

[57] ABSTRACT

This invention relates to nitrogen free heat cured foundry mixes essentially free of free formaldehyde comprising (a) a nitrogen free modified furan resin, (b) furfuryl alcohol, (c) polyvinyl acetate, preferably (d) a tar selected from the group consisting of resorcinol pitch, bisphenol A tar, and (e) a latent acid curing catalyst. The foundry mixes are used to prepare foundry shapes. They are cured in the presence of the latent acid curing catalyst by heating at an elevated temperature.

12 Claims, No Drawings

HEAT CURED FOUNDRY MIXES AND THEIR USE

CROSS REFERENCE TO RELATED APPLICATION

This application is a continuation-in-part application of U.S. application Ser. No. 08/180,264 filed on Jan. 12, 1994 now abandoned.

FIELD OF THE INVENTION

This invention relates to nitrogen free heat cured foundry mixes essentially free of free formaldehyde comprising (a) a nitrogen free modified furan resin, (b) furfuryl alcohol, (c) polyvinyl acetate, preferably (d) a tar selected from the group consisting of resorcinol pitch, bisphenol A tar, and (e) a latent acid curing catalyst. The foundry mixes are used to prepare foundry shapes. They are cured in the presence of the latent acid curing catalyst by heating at an elevated temperature.

BACKGROUND OF THE INVENTION

Heat cured binders based upon furan resins and furfuryl alcohol are well known. See for example U.S. Pat. Nos. 4,317,763, 4,451,577, and 4,383,098 which describe heat cured foundry binders, typically cured in the presence of a latent acid curing catalyst. These binders are preferred for some applications because of their price, the availability of equipment, and the dimensional accuracy of the foundry shapes made with them.

Typically heat cured binders, particularly hot-box binders, which are cured at temperatures of 100° C. to 300° C. in the presence of a latent acid curing catalyst, contain urea and other nitrogen containing compounds which scavenge free formaldehyde and provide extra strength to foundry shapes made with such binders. A problem with these heat curable foundry binders is that their high nitrogen content causes casting defects during metal casting processes such as pinholing and porosity. Another problem is that these binders contain free formaldehyde which is to be avoided.

It is also known that the bench life of foundry mixes made with these binders is often inadequate due to the presence of the latent acid-curing catalyst in the foundry mix. The bench life of the foundry mix is the time period between forming the mixture of the aggregate and binder and the time when the mixture is no longer useful for making acceptable molds and cores. A measure of mold and core acceptability is tensile strength. If a foundry mix consisting of aggregate and binder composition is used after the bench life has expired, the resulting molds and cores will have insufficient tensile strength.

Since the foundry mix made with a heat curable binder contains a latent acid curing catalyst in addition to the aggregate and resin, the catalyst and resin may react prior to shaping the mix into foundry molds and cores. If this reaction occurs, it will reduce the flowability of the foundry mix and the resulting molds and cores will have reduced strength. Additionally, it will be necessary to clean the hoppers, in which the foundry mix is stored, more frequently. This is time consuming and expensive.

SUMMARY OF THE INVENTION

This invention relates to nitrogen free heat cured foundry mixes essentially free of free formaldehyde comprising:
A. a major amount of foundry aggregate;
B. a foundry binder comprising:
   (1) from about 50 to about 90 parts by weight of a nitrogen free modified furan resin;
   (2) from about 1 to about 10 parts by weight of furfuryl alcohol;
   (3) from about 3 to about 20 parts by weight of polyvinyl acetate; and preferably (4) preferably from about 3 to about 20 parts by weight of a tar selected from the group consisting of resorcinol pitch, bisphenol A tar, and mixtures thereof,
wherein said parts of the binder components are by weight are based upon 100 parts the weight of the modified furan resin, and the weight ratio of foundry aggregate is from 100:1 to 100:10.

Preferably from about 60 to about 85 parts by weight of nitrogen free modified furan resin, from about 10 to about 15 parts by weight of furfuryl alcohol, from about 10 to about parts by weight of polyvinyl acetate, and from about 5 to about 10 parts by weight of a tar are used in the binder. Preferably a mixture of resorcinol pitch and bisphenol A tar is used.

The heat cured foundry mixes are used to prepare foundry shapes. The foundry shapes are cured in the presence of the latent acid curing catalyst, preferably copper tosylate, when they are heated at temperatures of about 100° C. to 300° C. Heat is applied with warm-box or hot-box equipment, baking in an oven, or with a microwave. Unlike typical heat cured binder systems, these binder systems are free of nitrogen and essentially free of free formaldehyde. By essentially free of free formaldehyde, it is meant that the free formaldehyde content of the binder is from 0.0 to 0.05 weight percent, based upon the total weight of the foundry binder.

Since the binders do not contain nitrogen, casting defects such as pinholing and porosity are not promoted. Although the tensile strengths of foundry shapes made with these binders is not significantly different than those made with nitrogen containing furan resins, it is remarkable that such strengths could be achieved without incorporating nitrogen compounds into the binder which promotes the formation of high strength urea linkages in the cured binder.

Although a bench life extender can be used in the binder, it is not necessary because the foundry mix has a bench life of up to five hours without the incorporation of a bench life extender.

ENABLING DISCLOSURE AND BEST MODE

The heat cured binders are based on a nitrogen free modified furan resin and furfuryl alcohol which are cured with a latent acid curing catalyst at temperatures of from about 100° C. to 300° C. The furfuryl alcohol acts as a diluent and reduces the viscosity of the modified furan resin. For purposes of this disclosure, a "modified furan resin" is a furan resin which is made from furfuryl alcohol, phenol, and formaldehyde at elevated temperatures under essentially alkaline conditions at a pH of from 8.0 to 9.0, preferably 8.4 to 8.7. The weight percent of furfuryl alcohol used in making the nitrogen free modified furan resins ranges from 50 to 65 percent; the weight percent of the phenol used in making the nitrogen free modified furan resins ranges from 10 to 25 percent; and the weight percent of the formaldehyde used in making the nitrogen free modified furan resins ranges from 15 to 25 percent, where all weight percents are based upon the total weight of the components used to make the modified furan resin.

The reaction temperature used in making the nitrogen free modified furan resins ranges from 95° C. to 105° C. The reaction is continued until the percentage of free formaldehyde is less than 5 weight percent, typically from 3 to 5 weight percent, and the refractive index is from 1,500 to about 1.600. The viscosity of the resin is preferably from about 200 cps to 450 cps.

The heat cured binders are made by combining the nitrogen free modified furan resin with furfuryl alcohol, polyvinyl acetate, and preferably a tar selected from the group consisting of resorcinol pitch, bisphenol A tar, and mixtures thereof to make a heat cured binder system.

Typically the polyvinyl acetate used has a molecular weight average of from about 1,000 to about 100,000, preferably from about 5,000 to about 25,000. A typical viscosity of the polyvinyl acetate, in any appropriate solvent (such as benzene) when required, is about 1 centipoise to about 25 centipoise, preferably about 1 centipoise to about 5 centipoise.

Bisphenol A tar is defined as the highly viscous product which remains on the bottom of the reaction vessel after bisphenol A is produced and distilled from the reaction vessel. The bisphenol A tar is a solid at room temperature and has a melting point of about 70° C. to 80° C. Bisphenol A tar is mostly dimers, trimers, and polymeric bis phenol A. It may also contain substituted materials.

Resorcinol pitch is defined as the highly viscous product which remains on the bottom of the reaction vessel after resorcinol is produced and distilled from the reaction vessel. Resorcinol pitch is a solid at room temperature and has a melting point of about 70° C. to 80° C. Resorcinol pitch is mostly dimers, trimers, and polymeric resorcinol. It may also contain substituted materials.

Preferably a mixture of bisphenol A tar and resorcinol pitch are used to modify the binder in an amount such that the ratio of bisphenol A tar to resorcinol pitch is from 3:1 to 1:3, most preferably about 1:1.

In general, many salts of a strong inorganic or organic acids, preferably organic acids, can be used as latent curing catalysts. Examples of salts from organic acids include copper phenol sulfonate, aluminum toluene sulfonate, zinc phenol sulfonate, and preferably copper toluene sulfonate, aluminum toluene sulfonate, and phenol toluene sulfonate, and the like, most preferably copper toluene sulfonate. The amount of latent curing catalyst used is the amount required to result in foundry shapes which can be handled without breaking. Generally, this amount is from 1 to 45 weight percent based upon the weight of total binder, typically from 10 to 40, preferably 15 to 35 weight percent.

It will be apparent to those skilled in the art that other additives such as release agents, solvents, etc. can be used and may be added to the binder composition, aggregate, or foundry mix. For example, where the foundry shape must show a higher degree of resistance to water, it is preferable to use a silane. In such cases the water may come from moisture in the air or special processing conditions of the foundry shapes, such as immersion in a core wash.

Silanes which can be used can be represented by the following structural formula:

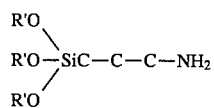

wherein R' is a hydrocarbon radical and preferably an alkyl radical of 1 to 6 carbon atoms and R is an alkyl radical, an alkoxy-substituted alkyl radical, or an alkyl-amine-substituted alkyl radical in which the alkyl groups have from 1 to 6 carbon atoms. The aforesaid silane, is employed in concentrations of 0.1% to 2%, based on the phenolic binder and hardener.

Examples of some commercially available silanes are Dow Corning Z6040; Union Carbide A-1100 (gamma aminopropyltriethoxy silane); Union Carbide A-1120 (N-beta(aminoethyl)-gamma-amino-propyltrimethoxy silane); and Union Carbide A-1160 (ureido-silane).

Although not required, bench life extenders may also be added to the binder formulation. Examples of bench life extenders include alkaline earth metal carbonates such as magnesium carbonate, calcium carbonate, and barium carbonate, and alkaline earth metal oxides such as magnesium oxide, calcium oxide, and barium oxide, preferably calcium carbonate. The particle size of the bench life extender typically is from about 0.5 micron to about 25 microns, preferably from about 1 micron to about 10 microns. It has been found that the use of the bench life extender in amounts of from 0.01 to 1.0 weight percent of the thermosetting resin, preferably 0.05 to 0.5 weight percent, most preferably 0.05 to 0.1 weight percent, are effective. Although more bench life extender can be used, this is unnecessary in most cases and only increases the cost of the binder without a significant increase in benefits, and in some cases may even decrease the bench life of the foundry mix.

Since the amount of bench life extender used on the sand is a very small amount, typically from 0,001 to 0.05 weight percent based upon the weight of the aggregate, most typically 0,001 to 0.01 weight percent, for most situations it is preferable to mix the alkaline earth metal carbonate with a silicone compound to form an emulsion before adding it to the aggregate. This is an effective way of distributing the small amount of bench life extender on the aggregate. Silicone compounds also improve the release of the foundry shapes made with the foundry mix.

Silicone compounds, which can be used in the foundry typically are polydimethylsiloxanes, often mix, trimethylsilyl terminated. Generally, they are sold commercially as fluids or emulsions (which contain water and a surfactant as well as the silicone compound). Examples of commercially available products which contain silicone compounds and are effective include DC 1101, DC 108, DC 24, DC 531. All of these mentioned products are emulsions except DC 531, and all are sold by Dow Corning Corporation. Examples of other commercially available silicone compounds are LE-460, AF-70 which are sold by Union Carbide and General Electric respectively. Typically the weight ratio of the bench life extender to the silicone is from 0.50 to 5.0 weight percent based upon the total weight of the emulsion containing the bench life extender.

The aggregate used to prepare the foundry mixes is that typically used in the foundry industry for such purposes or any aggregate that will work for such purposes. Generally, the aggregate will be sand which contains at least 70 percent by weight silica. Other suitable aggregate materials include zircon, alumina-silicate sand, chromite sand, and the like. Generally, the particle size of the aggregate is such that at least 80 percent by weight of the aggregate has an average particle size between 40 and 150 mesh (Tyler Screen Mesh).

Although it is possible to mix the components of the binder with the aggregate in various sequences, it is preferred to add the latent acid curing acid catalyst to the aggregate and mix it with the aggregate before adding the binder.

Curing is accomplished by heating the shaped foundry mix in an a convection oven, a microwave oven, or by means of another heat source. Generally, however, curing is accomplished by injecting the foundry mix into a core box which has been heated to a temperature sufficient to cure the foundry mix and produce a workable foundry shape. Generally, the temperature needed to cure the foundry mix is from 135° C. to 300° C., preferably from 160° C. to 260° C. A workable foundry shape is one which can be handled without breaking. Generally, the dwell time of shaped foundry mix in the core box needed to produce a workable foundry shape is from 5 seconds to 120 seconds, usually from 10 seconds to 60 seconds.

Metal castings can be prepared from the workable foundry shapes by methods well known in the art. Molten ferrous or non-ferrous metals are poured into or around the workable shape. The metal is allowed to cool and solidify, and then the casting is removed from the foundry shape.

The following abbreviations are used in the Examples and Table I which follow:

| | |
|---|---|
| BAT | = bisphenol A tar |
| BLE | = bench life extender |
| CT | = constant temperature |
| FA | = furfuryl alcohol |
| MFR | = a modified furan base resin for MFB which is the reaction product of a mixture of phenol, formaldehyde, and furfuryl alcohol under basic conditions at a reflux temperature of 100° C., such that the ratio of formaldehyde to phenol is 3:1 and the ratio of formaldehyde to furfuryl alcohol is 0.76:1.0 |
| MFB | = CHEM-REZ 244 binder, a nitrogen free modified furan binder sold by Ashland Chemical Company which comprises MER and FA as specified in Table I |
| PVAC | = polyvinyl acetate having a molecular weight average of about 20,000 sold by Monsanto Chemical under the GELVA tradename |
| RH | = relative humidity temperature |
| RP | = resorcinol pitch |

EXAMPLES (All weight percents are based upon the total charge.)

Foundry mixes were prepared by mixing 4000 parts of Badger sand and 8.5 parts of a copper tosylate catalyst for 2 minutes. Then 50 parts of binder composed of the amounts specified in Table I are added and mixed for 2 minutes.

The resulting foundry mixes are forced by air blowing the mix into a standard AFS core box (dog bone shape) which was heated to a temperature of 232° C. The tensile strengths (in psi) for various samples after being taken from the core box at specified dwell times (dwell times were 10, 20, 30, and 40 seconds), are given in Table I. The hot tensile measurements were taken within 10 seconds after removing the shapes from the core box. The cold tensiles were measured at least 1 hour after removing the shapes from the corebox.

The examples show that the foundry mixes tested had sufficient flowability and produced workable foundry shapes under the conditions tested.

EXAMPLES 1–6

Heat curable foundry binders were prepared with the mixtures of MFRB, FA, polyvinyl acetate, bisphenol A tar, and resorcinol pitch. The binders were cured with a copper toluene sulfonate catalyst. Example A is the control.

TABLE I

| Example | A | 1 | 2 | 3 | 4 | 5 |
|---|---|---|---|---|---|---|
| Component | AMOUNTS (pbw) | | | | | |
| MFRB | 84 | 72 | 72 | 64 | 60 | 63 |
| FA | 16 | 18 | 18 | 16 | 15 | 15 |
| PVA | 0 | 10 | 0 | 10 | 10 | 12 |
| BAT | 0 | 0 | 0 | 0 | 5 | 5 |
| RP | 0 | 0 | 10 | 10 | 10 | 5 |
| DWELL TIME | HOT TENSILES OF CORE SAMPLES (PSI) | | | | | |
| 10 sec. | 65 | 110 | 82 | 132 | 111 | 118 |
| 20 sec. | 104 | 189 | 136 | 165 | 197 | 202 |
| 30 sec. | 135 | 212 | 150 | 201 | 184 | 186 |
| 40 sec | 123 | 178 | 151 | 178 | 158 | 187 |

Table I shows that overall tensile strengths of foundry cores prepared with the subject binders are improved significantly when polyvinyl acetate (Example 1) is added to Control A. Example 2 shows that overall tensile strengths of foundry cores prepared with the subject binders are also improved if resorcinol (Example 2), but the effect is not as great as when polyvinyl acetate is used alone. The subject binders are essentially free of free formaldehyde and are able to produce foundry cores without using nitrogen containing compounds to build strength.

Examples 3–5 show that tensile strengths of foundry cores prepared with shorter dwell times improved if both polyvinyl acetate and resorcinol pitch, bisphenol A tar, or both are added to Control A. Using a mixture of polyvinyl acetate and a tar also has economical advantages since the tars are cheaper than polyvinyl acetate.

Cold tensile strengths were also measured, but are not shown in Table I because they were all found to be more than adequate for all foundry shapes made with all the tested binder formulations.

We claim:

1. A nitrogen free heat foundry mix essentially free of free formaldehyde comprising:
   A. a major amount of foundry aggregate;
   B. a foundry binder comprising:
      (1) from about 50 to about 90 parts by weight of a nitrogen free modified furan resin;
      (2) from about 1 to about 10 parts by weight of furfuryl alcohol;
      (3) from about 3 to about 20 parts by weight of polyvinyl acetate; and
      (4) from about 3 to about 20 parts by weight of a tar selected from the group consisting of resorcinol pitch, bisphenol A tar, and mixtures thereof;
   wherein said parts by weight of the binder components are based upon 100 parts the weight of the binder, and
   C. from 1 part by weight to about 45 parts by weight percent of a latent acid curing catalyst where said parts by weight of said latent curing catalyst are based upon the total weight of the binder, and the weight ratio of foundry aggregate to binder is from 100:1 to 100:10.

2. The foundry mix of claim 1 where the tar is resorcinol pitch.

3. The foundry mix of claim 2 where a mixture of bisphenol A pitch and resorcinol pitch is used in a weight ratio of 3:1 to 1:3.

4. A process for preparing a foundry shape comprising:
   A. mixing a foundry aggregate with a bonding amount of up to about 10 percent by weight, based upon the weight of the aggregate, of (1) a binder composition comprising:
   (a) from about 50 to about 90 parts by weight of a nitrogen free modified furan resin;
   (b) from about 1 to about 10 parts by weight of furfuryl alcohol;
   (c) from about 3 to about 20 parts by weight of polyvinyl acetate; and
   (d) from about 3 parts to about 20 parts by weight of a tar selected from the group consisting of resorcinol pitch, bisphenol A tar, and mixtures thereof, wherein said parts by weight of the binder components are based upon 100 parts the weight of the binder, and
   (2) from 1 part by weight to 45 parts by weight percent of a latent acid curing catalyst where said parts by weight of latent curing catalyst are based upon the total weight of the binder, and the weight ratio of foundry aggregate to binder is from 100:1 to 100:10.
B. shaping the foundry mix of A into a foundry shape;
C. contacting the foundry shape of B with a source of heat at a temperature sufficient to cure said mix; and
D. allowing the foundry shape to harden into a workable foundry shape.

5. The process of claim 4 wherein the tar is resorcinol pitch.

6. The process of claim 5 wherein a mixture of bisphenol A pitch and resorcinol pitch is used in a weight ratio of 3:1 to 1:3.

7. A foundry shape prepared in accordance with claim 4.

8. A foundry shape prepared in accordance with claim 5.

9. A method for preparing a metal casting comprising:
   (a) fabricating a shape in accordance with claim 5;
   (b) pouring said low melting metal while in the liquid state into and around said shape;
   (c) allowing said low melting metal to cool and solidify; and
   (d) then separating the molded article.

10. A method for preparing a metal casting comprising:
   (a) fabricating a shape in accordance with claim 6;
   (b) pouring said low melting metal while in the liquid state into and around said shape;
   (c) allowing said low melting metal to cool and solidify; and
   (d) then separating the molded article.

11. A metal casting prepared in accordance with claim 9.

12. A metal casting prepared in accordance with claim 10.

* * * * *